United States Patent
Ishiwata et al.

(10) Patent No.: US 12,471,740 B2
(45) Date of Patent: Nov. 18, 2025

(54) MOUNTING ORIENTATION ADJUSTMENT STAND FOR COOKING CONTAINER AND AUTOMATIC COOKING EQUIPMENT PROVIDED WITH SAME

(71) Applicant: TECHMAGIC INC., Tokyo (JP)

(72) Inventors: Eiji Ishiwata, Tokyo (JP); Kohei Yokouchi, Tokyo (JP); Naoto Watanabe, Tokyo (JP)

(73) Assignee: TECHMAGIC INC., Tokyo (JP)

( * ) Notice: Subject to any disclaimer, the term of this patent is extended or adjusted under 35 U.S.C. 154(b) by 0 days.

(21) Appl. No.: 18/751,343

(22) Filed: Jun. 24, 2024

(65) Prior Publication Data

US 2024/0341538 A1    Oct. 17, 2024

Related U.S. Application Data

(63) Continuation of application No. PCT/JP2022/035020, filed on Sep. 20, 2022.

(30) Foreign Application Priority Data

Dec. 27, 2021    (JP) ................. 2021-212000

(51) Int. Cl.
*A47J 44/00*    (2006.01)
*A47J 36/34*    (2006.01)

(52) U.S. Cl.
CPC ............... *A47J 44/00* (2013.01); *A47J 36/34* (2013.01)

(58) Field of Classification Search
CPC ............. A47J 44/00; A47J 36/34; A47J 27/14
USPC .................................................. 248/176.2
See application file for complete search history.

(56) References Cited

U.S. PATENT DOCUMENTS

| | | | | |
|---|---|---|---|---|
| 4,173,925 A * | 11/1979 | Leon | ............ | B01F 35/92 99/348 |
| 5,228,382 A * | 7/1993 | Hayashi | ............ | G07F 9/105 99/357 |
| 5,386,102 A * | 1/1995 | Takikawa | ............ | H05B 6/1227 219/652 |

(Continued)

FOREIGN PATENT DOCUMENTS

| | | |
|---|---|---|
| JP | 2000-135166 A | 5/2000 |
| WO | 2020166723 A2 | 8/2020 |

*Primary Examiner* — Muhammad Ijaz
(74) *Attorney, Agent, or Firm* — HAUPTMAN HAM, LLP

(57) ABSTRACT

Provided is a mounting orientation adjustment stand for a cooking container that can easily mount the cooking container on a cooking device in a constant mounting orientation. An adjustment stand is used for an automatic cooking equipment including a cooking-container-holding unit configured to detachably hold a cooking container, a cooking-container-transfer unit configured to transfer the cooking-container-holding unit to various conveyance positions, and a cooking device configured to detachably hold the cooking container and perform cooking. Here, the adjustment stand is configured to set a mounting orientation of the cooking container; a container placement plate configured to allow the cooking container to be rotatably placed thereon; an alignment member to set a mounting orientation of the cooking container around a rotating axis; and a distance adjustment mechanism configured to adjust distance between the container placement plate and the alignment member.

7 Claims, 10 Drawing Sheets

(56) References Cited

U.S. PATENT DOCUMENTS

| | | | |
|---|---|---|---|
| 6,843,166 B1* | 1/2005 | Li | A47J 27/14 |
| | | | 99/332 |
| 2003/0159593 A1* | 8/2003 | Leutwyler | A47J 27/18 |
| | | | 99/348 |
| 2017/0172350 A1* | 6/2017 | Farid | A47J 44/00 |
| 2019/0329419 A1 | 10/2019 | Farid et al. | |
| 2021/0321813 A1 | 10/2021 | Shiraki | |

* cited by examiner

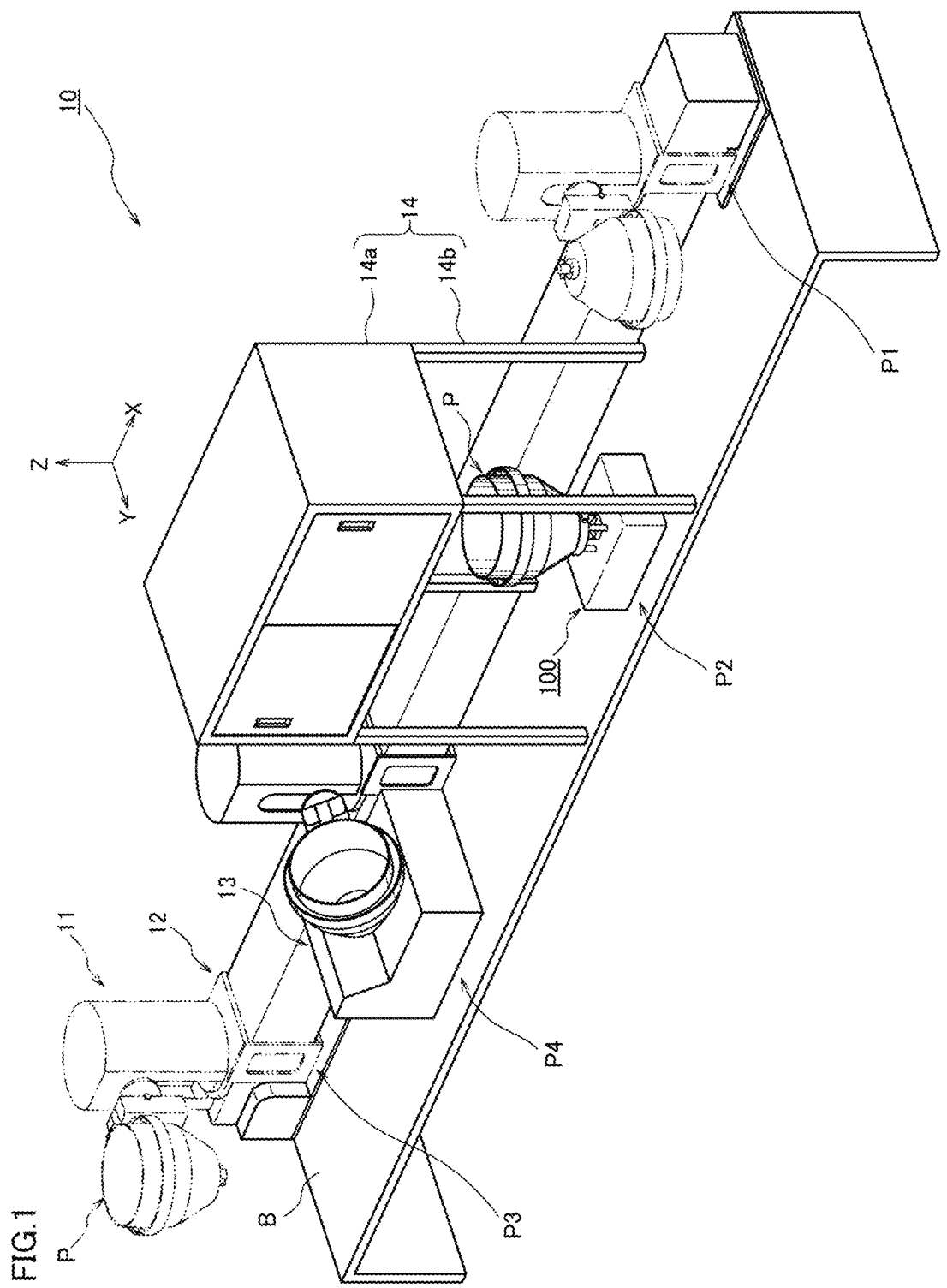

MOUNTING ORIENTATION ADJUSTMENT STAND FOR COOKING CONTAINER AND AUTOMATIC COOKING EQUIPMENT PROVIDED WITH SAME

RELATED APPLICATIONS

The present application is a continuation application of International Application No. PCT/JP2022/035020 filed Sep. 20, 2022, which claims priority to Japanese Patent Application Number 2021-212000, filed Dec. 27, 2021, the disclosures of which applications are hereby incorporated by reference herein in their entirety.

TECHNICAL FIELD

The present invention relates to a mounting orientation adjustment stand for a cooking container, and particularly relates to a mounting orientation adjustment stand, for a cooking container, that sets and adjusts the mounting orientation of the cooking container that is mounted on a cooking device in automatic cooking equipment.

BACKGROUND ART

In recent years, in the food and beverage industry, the automation of cooking operations is progressing because of various reasons such as the circumstances involved in securing cooks, maintaining cooking skills, and improving the cooking environment.

Conventionally known automatic cooking equipment includes: a cooking-container-holding unit that holds and displaces a cooking container in accordance with cooking procedures such as lifting and lowering, rotating, or turning, the cooking container being configured to receive a food material so that the food material is freely stored; a cooking-container-transfer unit that transfers the cooking-container-holding unit to various conveyance positions in accordance with the cooking procedures; a control unit that drives and controls the cooking-container-holding unit and the cooking-container-transfer unit; and a cooking device that heats the cooking container while detachably holding the cooking container and maintaining an orientation where the cooking container is inclined at a prescribed angle relative to a vertically upward orientation (see, for example, Patent Literature 1).

The cooking device has a container-rotating part that engages with an arm-shaped passive part provided at the center of a bottom part of the cooking device to rotate the cooking container.

In a state where the container-rotating part and the cooking container are engaged with each other, the cooking device heats the cooking container while rotating the container-rotating part so as to evenly heat the food material in the cooking container.

CITATION LIST

Patent Literature

PTL 1: WO2020/166723 (in particular, see FIG. 6)

SUMMARY OF INVENTION

Technical Problem

In the automatic cooking equipment as described above, there is a necessity of attaching and detaching the cooking container to and from a heating cooking device many times. Depending on the mounting orientation of the cooking container, there is a problem that sufficient engagement of the arm-shaped passive part of the cooking container with the container-rotating part of the heating cooking device is difficult to achieve.

Accordingly, the present invention has been made in order to solve the problem with the conventional technology as described above, and an object of the present invention is to provide a mounting orientation adjustment stand, for a cooking container, that can easily mount the cooking container on a cooking device while maintaining a constant mounting orientation.

Solution to Problem

To solve the aforementioned problem, the invention according to claim 1 relates to a mounting orientation adjustment stand, for a cooking container, that sets and adjusts a mounting orientation of a cooking container with respect to a cooking device, used in automatic cooking equipment including a cooking-container-holding unit configured to detachably hold the cooking container, the cooking container being configured to receive a food material so that the food material is freely stored, a cooking-container-transfer unit configured to transfer the cooking-container-holding unit to various conveyance positions in accordance with the cooking procedures, and a cooking device configured to detachably hold the cooking container and perform cooking, the mounting orientation adjustment stand comprising: a container placement plate, allowing the cooking container to be rotatably placed thereon; an alignment member to set a mounting orientation of the cooking container around a rotating axis; and a distance adjustment mechanism configured to adjust distance between the container placement plate and the alignment member.

To further solve the aforementioned problem, in the invention according to claim 2, in addition to the configuration of the mounting orientation adjustment stand for a cooking container according to claim 1, further comprising an adjustment stand body disposed facing the cooking-container-transfer unit to wait for the cooking container; and the container placement plate is an annular shaped member, facing a flat top surface of the adjustment stand body at a distance, allowing the cooking container to be rotatably placed thereon.

To further solve the aforementioned problem, in the invention according to claim 3, in addition to the configuration of the mounting orientation adjustment stand for a cooking container according to claim 1, the distance adjustment mechanism is a placement-plate-lifting mechanism configured to lift and lower the container placement plate with respect to the top surface of the adjustment stand body.

To further solve the aforementioned problem, in the invention according to claim 4, in addition to the configuration of the mounting orientation adjustment stand for a cooking container according to claim 1, the cooking container includes an arm-shaped passive part provided at a center of a bottom part of the cooking container so as to protrude in a horizontal direction, and the alignment member includes a plurality of recessed seating parts that are provided in a circumferential direction of the alignment member to house the arm-shaped passive part of the cooking container, protruding guide parts smoothly coupled with the plurality of recessed seating parts, and rollers disposed at top regions of the protruding guide parts so as to be rotatable in the circumferential direction.

To further solve the aforementioned problem, in the invention according to claim 5, in addition to the configuration of the mounting orientation adjustment stand for a cooking container according to claim 1, the cooking container includes an insertion shaft part that is provided so as to protrude downward from the center of the bottom part of the cooking container and to be inserted into the container placement plate, a base shaft part extending from the insertion shaft part and being smaller in diameter than the insertion shaft part, and the arm-shaped passive part extending in a horizontal direction from the base shaft part, the container placement plate includes an insertion hole part formed in a center of the container placement plate to allow insertion of the insertion shaft part of the cooking container and an opening part, for a base shaft, that expands in a fan shape from the insertion hole part and draws out the base shaft part of the cooking container in the horizontal direction, so that the container placement plate is formed into a C-shape, and the opening part, for a base shaft, formed in the container placement plate has a minimum opening width that is smaller than a diameter of the insertion shaft part formed on the cooking container and larger than a diameter of the base shaft part formed on the cooking container.

To further solve the aforementioned problem, in the invention according to claim 6, in addition to the configuration of the mounting orientation adjustment stand for a cooking container according to claim 5, the insertion hole part formed in the container placement plate has a diameter substantially equal to the diameter of the insertion shaft part formed on the cooking container.

To further solve the aforementioned problem, the invention according to claim 7 relates to automatic cooking equipment configured to cook a food material stored in a bottomed cylindrical cooking container, the automatic cooking equipment including: a cooking-container-holding unit configured to detachably hold and displace the cooking container in accordance with cooking procedures, the cooking container being configured to receive a food material so that the food material is freely stored; a cooking-container-transfer unit configured to transfer the cooking-container-holding unit to various conveyance positions in accordance with the cooking procedures; a cooking device configured to detachably hold the cooking container and perform cooking while rotating the cooking container; and the mounting orientation adjustment stand for a cooking container according to claim 1, the mounting orientation adjustment stand for a cooking container being configured to set and adjust an orientation of the cooking container with respect to the cooking device.

Advantageous Effects of Invention

The mounting orientation adjustment stand for a cooking container according to claim 1 includes: a container placement plate, allowing the cooking container to be rotatably placed thereon; an alignment member to set a mounting orientation of the cooking container around a rotating axis; and a distance adjustment mechanism configured to adjust distance between the container placement plate and the alignment member. Accordingly, the mounting orientation of the cooking container with respect to the cooking device can be adjusted to a prescribed mounting orientation by simply lowering the container placement plate having the cooking container placed thereon, and therefore the mounting orientation of the cooking container with respect to the cooking device can be easily adjusted to a prescribed mounting orientation by simply lowering the container placement plate.

In the mounting orientation adjustment stand for a cooking container according to claim 2, having the effects demonstrated by the mounting orientation adjustment stand for a cooking container of the invention according to claim 1, further comprising an adjustment stand body disposed facing the cooking-container-transfer unit to wait for the cooking container; and the container placement plate is an annular shaped member, facing a flat top surface of the adjustment stand body at a distance, allowing the cooking container to be rotatably placed thereon.

In the mounting orientation adjustment stand for a cooking container according to claim 3, having the effects demonstrated by the mounting orientation adjustment stand for a cooking container of the invention according to claim 1, the distance adjustment mechanism is a placement-plate-lifting mechanism configured to lift and lower the container placement plate with respect to the top surface of the adjustment stand body.

In the mounting orientation adjustment stand for a cooking container according to claim 4, having the effects demonstrated by the mounting orientation adjustment stand for a cooking container of the invention according to claim 1, the cooking container includes an arm-shaped passive part provided at a center of a bottom part of the cooking container so as to protrude in a horizontal direction, and the alignment member includes a plurality of recessed seating parts that are provided in a circumferential direction of the alignment member to house the arm-shaped passive part of the cooking container, protruding guide parts smoothly coupled with the plurality of recessed seating parts, and rollers disposed at top regions of the protruding guide parts so as to be rotatable in the circumferential direction. Accordingly, even when the cooking container is placed on the container placement plate in an orientation where the arm-shaped passive part of the cooking container is not housed in the recessed seating parts of the alignment member, and, in this state, the container placement plate is lowered so that the arm-shaped passive part of the cooking container abuts against the alignment member, the arm-shaped passive part of the cooking container is pressed to the recessed seating parts by its own weight of the cooking container. As a result, the cooking container rotates along the protruding guide parts of the alignment member, which makes it possible to easily set the mounting orientation of the cooking container with respect to the cooking device to a prescribed mounting orientation.

In the mounting orientation adjustment stand for a cooking container according to claim 5, having the effects demonstrated by the mounting orientation adjustment stand for a cooking container of the invention according to claim 1, the container placement plate includes an insertion hole part formed at the center of the container placement plate to allow insertion of the insertion shaft part of the cooking container and also includes an opening part, for a base shaft, that expands in a fan shape from the insertion hole part and draws out the base shaft part of the cooking container in the horizontal direction, so that the container placement plate is formed into a C-shape, and the opening part, for a base shaft, formed on the container placement plate has a minimum opening width that is smaller than a diameter of the insertion shaft part formed on the cooking container and larger than a diameter of the base shaft part formed on the cooking container. Accordingly, in the state where the insertion shaft part formed on the cooking container is inserted into the insertion hole part formed in the container placement plate and the cooking container is placed on the container placement plate, the cooking container is not detached from the opening part for a base shaft. On the other hand, in the state where the cooking container is slightly lifted with respect to the container placement plate and the base shaft part of the cooking container is inserted into the hole part of the container placement plate, the cooking container is detached from the opening part for a base shaft. This effect makes it possible to attach and detach the cooking container to and from the mounting orientation adjustment stand for a cooking container with a small movement amount.

In the mounting orientation adjustment stand for a cooking container according to claim 6, having the effects demonstrated by the mounting orientation adjustment stand for a cooking container of the invention according to claim 5, the insertion hole part formed in the container placement plate has a diameter substantially equal to the diameter of the insertion shaft part formed on the cooking container. Accordingly, the cooking container, when in the state of being placed on the container placement plate, is not easily moved in an upper and lower direction from the container placement plate. This effect can make it less likely that the cooking container rises from the container placement plate when the container placement plate is lowered and the arm-shaped passive part of the cooking container is made to abut against the alignment member.

The automatic cooking equipment of the invention according to claim 7 includes the mounting orientation adjustment stand for a cooking container according to claim 1 that sets and adjusts an orientation of the cooking container with respect to a cooking device. Accordingly, when the cooking container is directly transferred from the mounting orientation adjustment stand for a cooking container to the cooking device, the cooking container is engaged with the cooking device without the necessity of complex mechanisms or controls in engaging the cooking container with the cooking device. As a result, a cooking device with a simple structure can be implemented.

BRIEF DESCRIPTION OF THE DRAWINGS

FIG. 1 is a perspective view of automatic cooking equipment that is an example of the present invention.

DESCRIPTION OF EMBODIMENTS

Figure 2A:
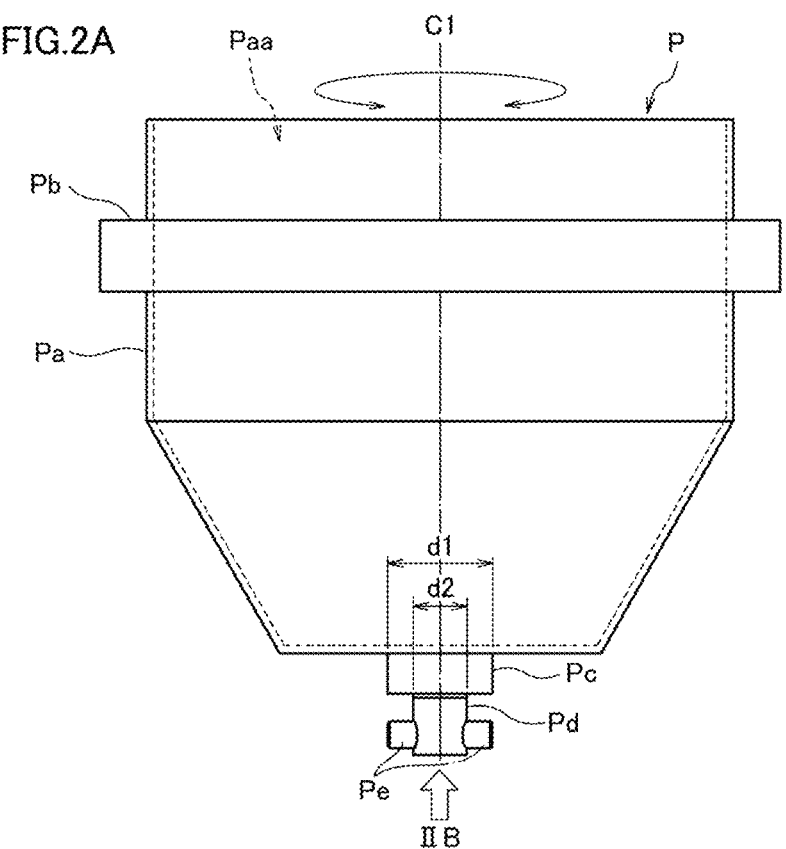
FIG. 2A is a front view of a cooking container shown in FIG. 1.

The present invention relates to a mounting orientation adjustment stand, for a cooking container, that sets and adjusts a mounting orientation of a bottomed cylindrical cooking container with respect to a cooking device, used in automatic cooking equipment including: a cooking-container-holding unit configured to detachably hold and displace the cooking container in accordance with cooking procedures, the cooking container being configured to receive a food material so that the food material is freely stored; a cooking-container-transfer unit configured to transfer the cooking-container-holding unit to various conveyance positions in accordance with the cooking procedures; and a cooking device configured to detachably hold the cooking container and perform cooking while rotating the cooking container. The mounting orientation adjustment stand includes: an adjustment stand body disposed facing the cooking-container-transfer unit to wait for the cooking container; an annular container placement plate facing a flat top surface of the adjustment stand body at a distance, allowing the cooking container to be rotatably placed thereon; a placement-plate-lifting mechanism configured to lift and lower the container placement plate with respect to the top surface of the adjustment stand body; and an alignment member that is placed on the top surface of the adjustment stand body to set a mounting orientation of the cooking container around a rotating axis with respect to the cooking device. The specific embodiment of the orientation adjustment stand for a cooking container may be any embodiments as long as it is possible to easily mount the cooking device with the mounting orientation of the cooking container with respect to the cooking device being a prescribed mounting orientation.

For example, as for specific use aspects of the automatic cooking equipment of the present invention, the automatic cooking equipment may be incorporated in various automatic food-serving systems that automatically serve food as long as it is possible to transfer the cooking container, which is aligned by the mounting orientation adjustment stand for a cooking container, to the cooking device that performs cooking while rotating the cooking container, with the aligned state being maintained by the cooking-container-holding unit and the cooking-container-transfer unit.

Specifically, the automatic cooking equipment may be incorporated in a pasta-dish-serving system, may be incorporated in an automatic fried-food-serving system, or may be incorporated in an automatic salad-dish-serving system that automatically serves a salad prepared by mixing cut vegetables.

EXAMPLES

Hereinafter, with reference to FIGS. 1 to 11B, an adjustment stand (mounting orientation adjustment stand for a cooking container) 100, and automatic cooking equipment 10 provided with the adjustment stand 100 will be described as examples of the present invention.

<1. Outline of Automatic Cooking Equipment 10>

First, the outline of the automatic cooking equipment 10 will be described with reference to FIG. 1, which is a perspective view of the automatic cooking equipment 10 as an example of the present invention.

Note that in FIG. 1, three axis directions of X, Y, and Z are shown for convenience, and some of the devices used for cooking are omitted.

The automatic cooking equipment 10 that is an example of the present invention is incorporated into an automatic pasta-dish-serving system that automatically cooks and serves pasta in response to the order of a customer.

The automatic cooking equipment 10 includes: a cooking-container-holding unit 11 configured to detachably hold a bottomed cylindrical cooking container P, which receives a food material so that the food material is freely stored, and also configured to displace the cooking container P in accordance with cooking procedures; a cooking-container-transfer unit 12 configured to transfer the cooking-container-holding unit 11 to various conveyance positions in accordance with the cooking procedures; a cooking device 13 that is placed on a base B to perform cooking while detachably holding the cooking container P; a food material supply device 14 placed on the base B to supply food materials of pasta to the cooking container P; a noodle supply device (illustration omitted) configured to supply boiled pasta noodles to the cooking container P; a dishing-up device (illustration omitted) configured to take a cooked pasta dish out of the cooking container P and dishes up the pasta dish; a washing device (illustration omitted) configured to wash the used cooking container P; and the adjustment stand 100 configured to set and adjust the mounting orientation of the cooking container P with respect to the cooking device 13.

The cooking device 13 agitates and cooks the food materials stored in the cooking container P while rotating and heating the cooking container P.

The cooking device 13 also includes a container-rotating part (illustration omitted) that can be engaged with the cooking container P.

The food material supply device 14 includes: a supply device body 14a that is provided directly above the adjustment stand 100 and is configured to store and automatically supply food materials to the cooking container P; and legs 14b that are provided on a lower surface of the supply device body 14a and are in contact with the base B.

Here, an example of the automatic cooking procedures for a pasta dish using the automatic cooking equipment 10 will be described.

First, the cooking-container-transfer unit 12 transfers the cooking container P to a conveyance position P1 that is directly above the washing device, and the washing device washes the cooking container P.

Next, the cooking container P is transferred from the conveyance position P1 to a conveyance position P2 that is directly below a food material supply port (illustration omitted) of the food material supply device 14, and the cooking container P is placed on the adjustment stand 100.

Then, the food materials of the pasta are dropped into the cooking container P through the food material supply port of the food material supply device 14.

Next, the cooking container P containing the food materials of the pasta is transferred from the conveyance position P2 to a conveyance position P3 where the cooking container P receives boiled pasta noodles fed from the noodle supply device.

Subsequently, the boiled pasta noodles are dropped into the cooking container P from the noodle supply device.

The cooking container P is then transferred from the conveyance position P3 to a conveyance position P4 where the cooking device 13 and the cooking container P can be engaged with each other.

Then, the cooking container P is engaged with the cooking device 13 so as to be heated while rotating.

Next, the cooking container P containing the heated and cooked pasta dish is transferred from the conveyance position P4 to an unillustrated dishing-up position.

The dishing-up device dishes up the pasta dish from the cooking container P on a serving plate or the like. As a result, the sequential automatic cooking of the pasta dish is completed.

When the dishing-up is completed, the cooking container is once again returned to the conveyance position P1, and the washing device washes the cooking container. After that, a series of automatic cooking procedures of the pasta dish described above is repeated.

<2. Cooking Container P>

Next, the detailed configuration of the cooking container P, used in the automatic cooking equipment 10 as an embodiment of the present invention, will be described with reference to FIGS. 2A and 2B.

Figure 2B:
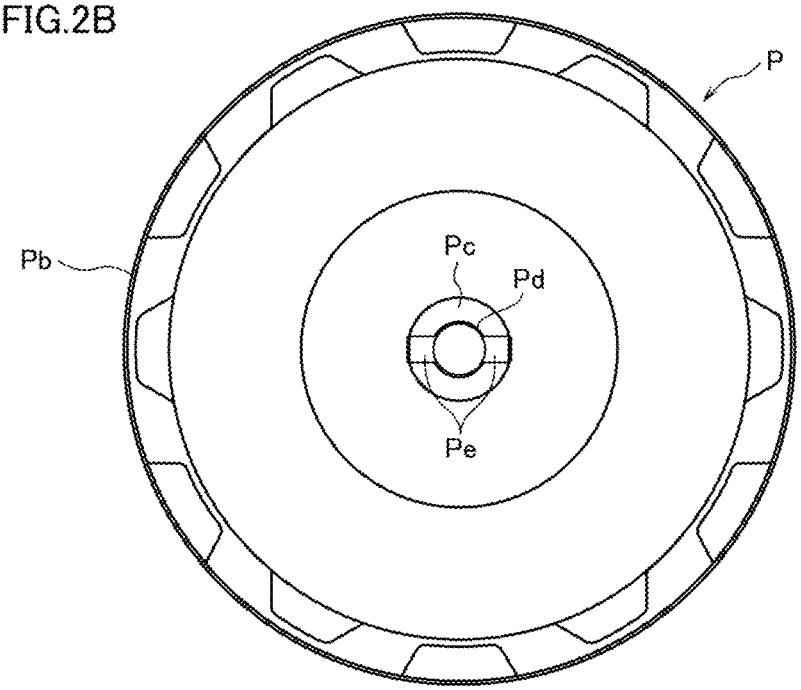
FIG. 2B is a view as viewed from a IIB direction in FIG. 2A.

FIG. 2A is a front view of the cooking container P shown in FIG. 1. FIG. 2B is a view as viewed from a IIB direction in FIG. 2A.

The cooking container P includes: a bottomed cylindrical container body Pa provided with a food-material-storing space Paa that receives food materials so that the food materials are freely stored; a flange part Pb provided around an outer peripheral surface of the container body Pa; an insertion shaft part Pc protruding coaxially with a rotating axis C1 of the cooking container P in a downward direction from the center of a bottom part of the container body Pa; a base shaft part Pd protruding coaxially with the insertion shaft part Pc in the downward direction from the insertion shaft part Pc; and a pair of arm-shaped passive parts Pe protruding from both the sides of the base shaft part Pd in a horizontal direction.

Here, although the cooking container P is preferably made of stainless steel in consideration of handling in heating cooking, washing, or the like, the cooking container P may be made of a metal material other than stainless steel, such as aluminum.

The base shaft part Pd has a diameter d2 that is smaller than a diameter d1 of the insertion shaft part Pc.

The arm-shaped passive parts Pe are freely engaged with the container-rotating part of the cooking device 13.

<3. Adjustment Stand 100>

Next, the outline of the adjustment stand 100 used in the automatic cooking equipment 10 will be described with reference to FIGS. 1 and 3 to 5.

Figure 3:
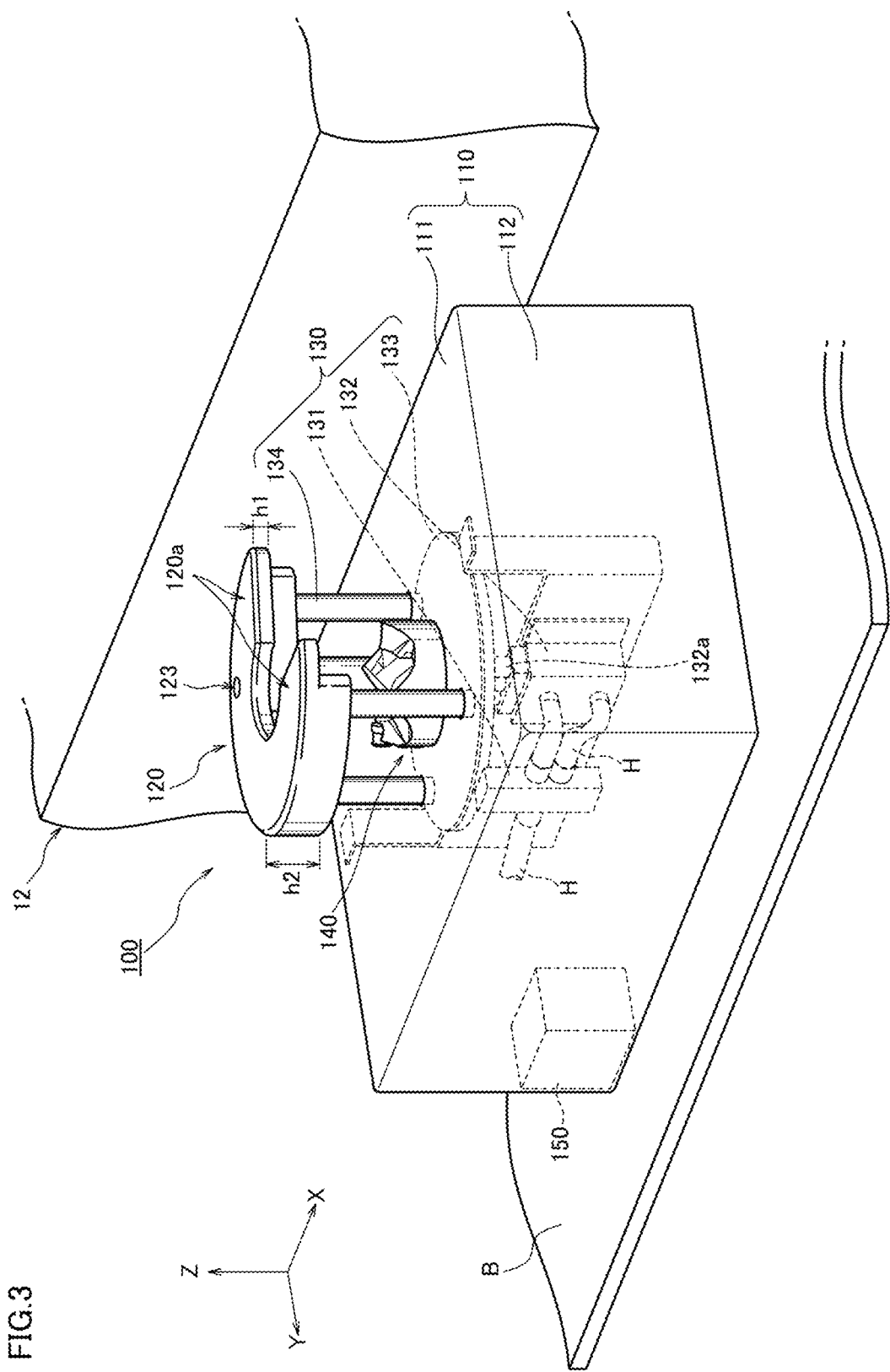
FIG. 3 is a perspective view of an adjustment stand shown in FIG. 1.
Figure 4:
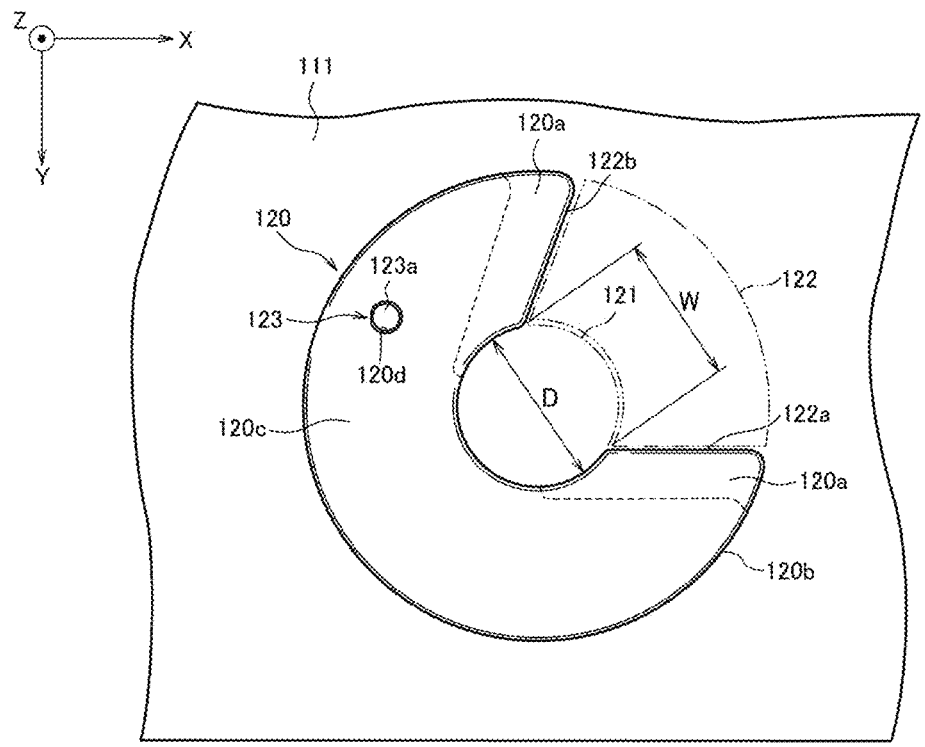
FIG. 4 is a top view of a container placement plate shown in FIG. 3.
Figure 5:
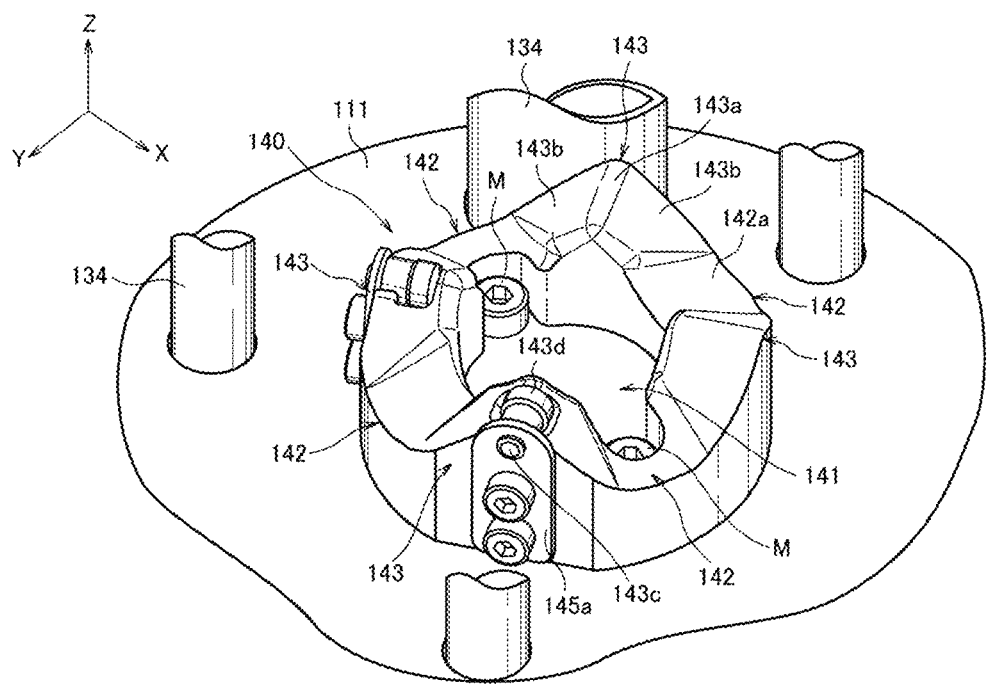
FIG. 5 is a perspective view showing the structure around an alignment member shown in FIG. 3.

FIG. 3 is a perspective view of the adjustment stand 100 shown in FIG. 1. FIG. 4 is a top view of a container placement plate 120 shown in FIG. 3. FIG. 5 is a perspective view showing the structure around an alignment member 140 shown in FIG. 3.

Note that in FIGS. 3 to 5, three axis directions of X, Y, and Z are shown.

As shown in FIG. 1, the adjustment stand 100 is placed on the base B and is disposed facing the cooking-container-transfer unit 12 to set and adjust the mounting orientation of the arm-shaped passive parts Pe, which are formed on the cooking container P, with respect to the cooking device 13.

The adjustment stand 100 is disposed directly below the food material supply port of the food material supply device 14.

As shown in FIG. 3, the adjustment stand 100 includes: an adjustment stand body 110 that is placed on the base B and waits for the cooking container P; the annular container placement plate 120 that allows the cooking container P to be rotatably placed thereon; a placement-plate-lifting mechanism 130 configured to lift and lower the container placement plate 120 with respect to the adjustment stand body 110; the alignment member 140 configured to set a mounting orientation of the cooking container P around the rotating axis C1 with respect to the cooking device 13, and a control unit 150 configured to drive and control the placement-plate-lifting mechanism 130.

<3.1. Adjustment Stand Body 110>

As shown in FIG. 3, the adjustment stand body 110, which is disposed facing the cooking-container-transfer unit 12, is formed in a box shape and includes a flat top surface 111 and a peripheral side surface 112 extending downward from a peripheral edge of the top surface 111.

<3.2. Container Placement Plate 120>

As shown in FIG. 3, the container placement plate 120 faces the flat top surface 111 of the adjustment stand body 110 at a distance, and is formed into a C-shape with a circular insertion hole part 121 formed at the center and a fan-shaped opening part 122 for a base shaft as shown in FIG. 4.

As shown in FIG. 3, vicinity portions 120a of the opening part 122 for a base shaft has a thickness h1 that is thinner than a thickness h2 of other portions.

The container placement plate 120 further includes a container detection sensor 123 configured to detect the presence or absence of the cooking container P placed on the container placement plate 120.

The insertion hole part 121 has a diameter that is substantially equal to the diameter d1 of the insertion shaft part Pc of the cooking container.

Therefore, the insertion hole part 121 allows insertion of the insertion shaft part Pc and the base shaft part Pd of the cooking container P.

The opening part 122 for a base shaft is opened so as to form a connection to the insertion hole part 121 at the center from the outer peripheral edge surfaces 120b of the container placement plate 120. The opening part 122 is formed into a fan shape in which an opening width of the container placement plate 120 gradually becomes small from an outer peripheral side to an inner peripheral side so that an inner opening width W on the inner peripheral side of the container placement plate 120, that is, the side connecting to the insertion hole part 121, is the smallest.

The inner opening width (minimum opening width) W of the opening part 122 for a base shaft is set to be smaller than the diameter d1 of the insertion shaft part Pc formed on the cooking container P and set to be larger than the diameter d2 of the base shaft part Pd formed on the cooking container P.

One opening inner edge surface 122a of the opening part 122 for a base shaft is provided along a transfer direction (X direction) of the cooking container P, which is transferred from the washing device to above the container placement plate 120.

The other opening inner edge surface 122b of the opening part 122 for a base shaft is provided along a detachment direction of the cooking container P when the cooking container P is detached from the container placement plate 120.

The detachment direction, which extends to the conveyance position P1, is the direction to avoid contact with the legs 14b of the food material supply device 14 and to reduce a transfer distance to a next transfer destination.

The container detection sensor 123 is a proximity sensor that is connected to the control unit 150.

The container detection sensor 123 is incorporated into a round hole 120d formed in an upper surface 120c of the container placement plate 120 with a detection surface 123a being exposed in the state of facing upward.

<3.3. Placement-Plate-Lifting Mechanism 130>

The placement-plate-lifting mechanism 130 is used to lift and lower the container placement plate 120 with respect to the top surface 111 of the adjustment stand body 110. As shown in FIG. 3, the placement-plate-lifting mechanism 130 includes: a solenoid valve 131 connected via an air hose H to an unillustrated air source; an air cylinder 132 connected to the solenoid valve 131 via the air hose H; a lifting plate 133 that is coupled with the air cylinder 132 and is freely lifted and lowered; and four coupling columns 134 that couple the upper surface of the lifting plate 133 and the lower surface of the container placement plate 120 at a distance.

The solenoid valve 131 is connected to the control unit 150 to open and close an air passage from an air supply source to the air cylinder 132 on the basis of a command signal from the control unit 150.

The air cylinder 132 includes a rod 132a that moves up and down by air pressure.

As shown in FIG. 3, the lifting plate 133 is provided inside the adjustment stand body 110, and the lower surface of the lifting plate 133 is coupled with a tip of the rod 132a of the air cylinder 132.

The four coupling columns 134 extend through the top surface 111 of the adjustment stand body 110.

Of these four coupling columns 134, one coupling column 134 is hollow so as to house a lower end part of the container detection sensor 123, which is incorporated in the container placement plate 120 with the detection surface 123a facing upward, and also to house a lead wire extending from the lower end part and connected to the control unit 150.

<3.4 Alignment Member 140>

As shown in FIG. 5, the alignment member 140 is a disk-shaped member, which is placed and fixed on the top surface 111 of the adjustment stand body 110 by a fixing member M such as a bolt.

The alignment member 140 includes a container housing recess part 141 configured to house the base shaft part Pd of the cooking container P, and recessed seating parts 142 and protruding guide parts 143 surrounding the container housing recess part 141.

The container housing recess part 141 is in a flat circular shape in plan view, with its diameter being larger than the diameter d2 of the base shaft part Pd of the cooking container P and smaller than the diameter d1 of the insertion shaft part Pc of the cooking container P.

As shown in FIG. 5, four recessed seating parts 142 and four protruding guide parts 143 are provided, and they are disposed alternately, smoothly, and continuously.

In plan view, the recessed seating parts 142 and the protruding guide parts 143 are provided in rotational symmetry about the container housing recess part 141, that is, in a circumferential direction of the alignment member 140.

In other words, bottom part regions 142a of the recessed seating parts 142 and top regions 143a of the protruding guide parts 143 are provided at roughly 45-degree intervals in the circumference direction of the alignment member 140.

The recessed seating parts 142 house the arm-shaped passive parts Pe of the cooking container P with the bottom part regions 142a.

The protruding guide parts 143 each have a downward inclined guide surface 143b that provides smooth coupling between the top region 143a of the protruding guide part 143 and the recessed seating part 142.

Of these four protruding guide parts 143, two protruding guide parts 143, which are adjacent to each other with one recessed seating part 142 interposed therebetween, have top regions 143a, and the top regions 143a each have a roller 143d disposed so as to be supported by a rotary shaft 143c extending in a radial direction of the alignment member 140 and freely rotatable in the circumferential direction.

The roller 143d is partially housed in a groove provided in the top region 143a of each of the protruding guide parts 143 in the state where an outer peripheral surface of an upper part of the roller 143d is positioned above the top region 143a of each of the protruding guide parts 143.

<3.5 Control Unit 150>

The control unit 150 controls the solenoid valve 131 and the air cylinder 132 so as to lift and lower the container placement plate 120 in accordance with the result of detection of the cooking container P by the container detection sensor 123.

<4. Aligning Cooking Container P>

Next, the aligning operation of the cooking container P with respect to the cooking device 13 using the adjustment stand 100 will be described with reference to FIGS. 6A to 11B.

<4.1. Case where Deviation Amount in Mounting Orientation Around the Rotating Axis of Cooking Container P is Small>

First, the aligning operation of the cooking container P in a case where the deviation amount in mounting orientation around the rotating axis of the cooking container P is small will be described with reference to FIGS. 6A to 10B.

Figure 6A:
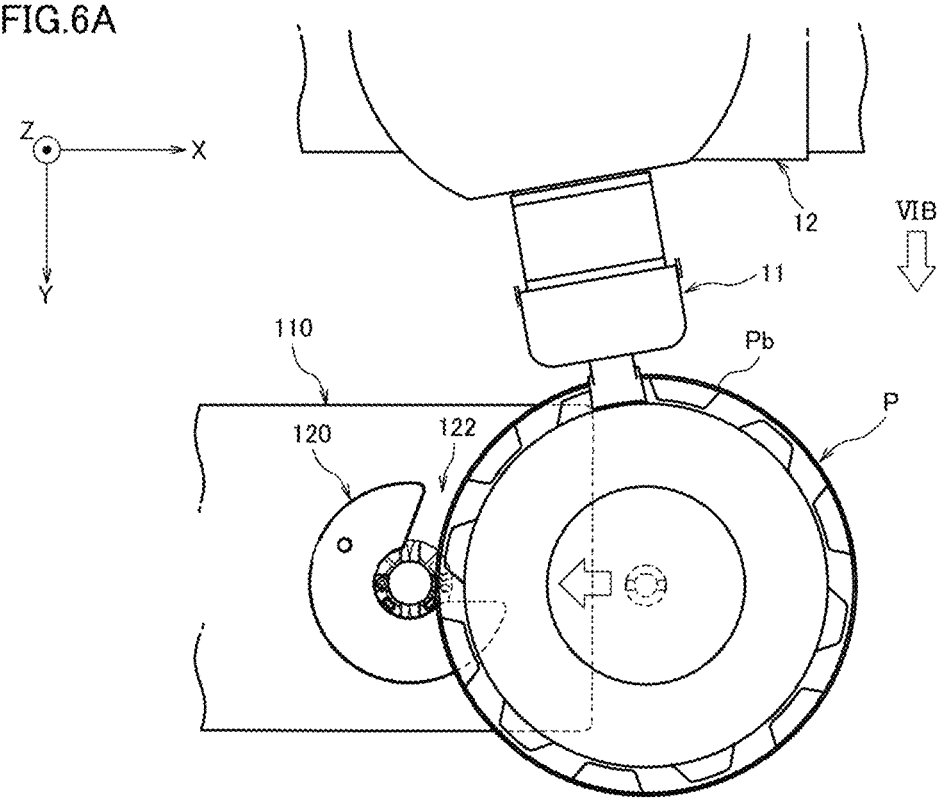
FIG. 6A is a top view showing the positional relationship between the cooking container to be transferred to the adjustment stand and the adjustment stand.
Figure 6B:
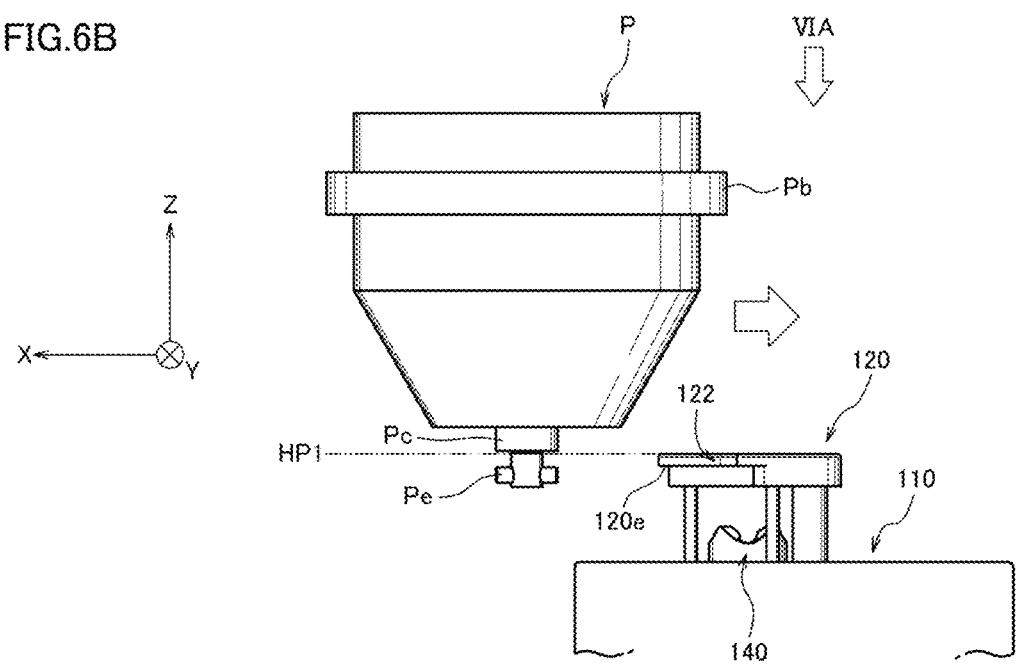
FIG. 6B is a view as viewed from a VIB direction in FIG. 6A.
Figure 7:
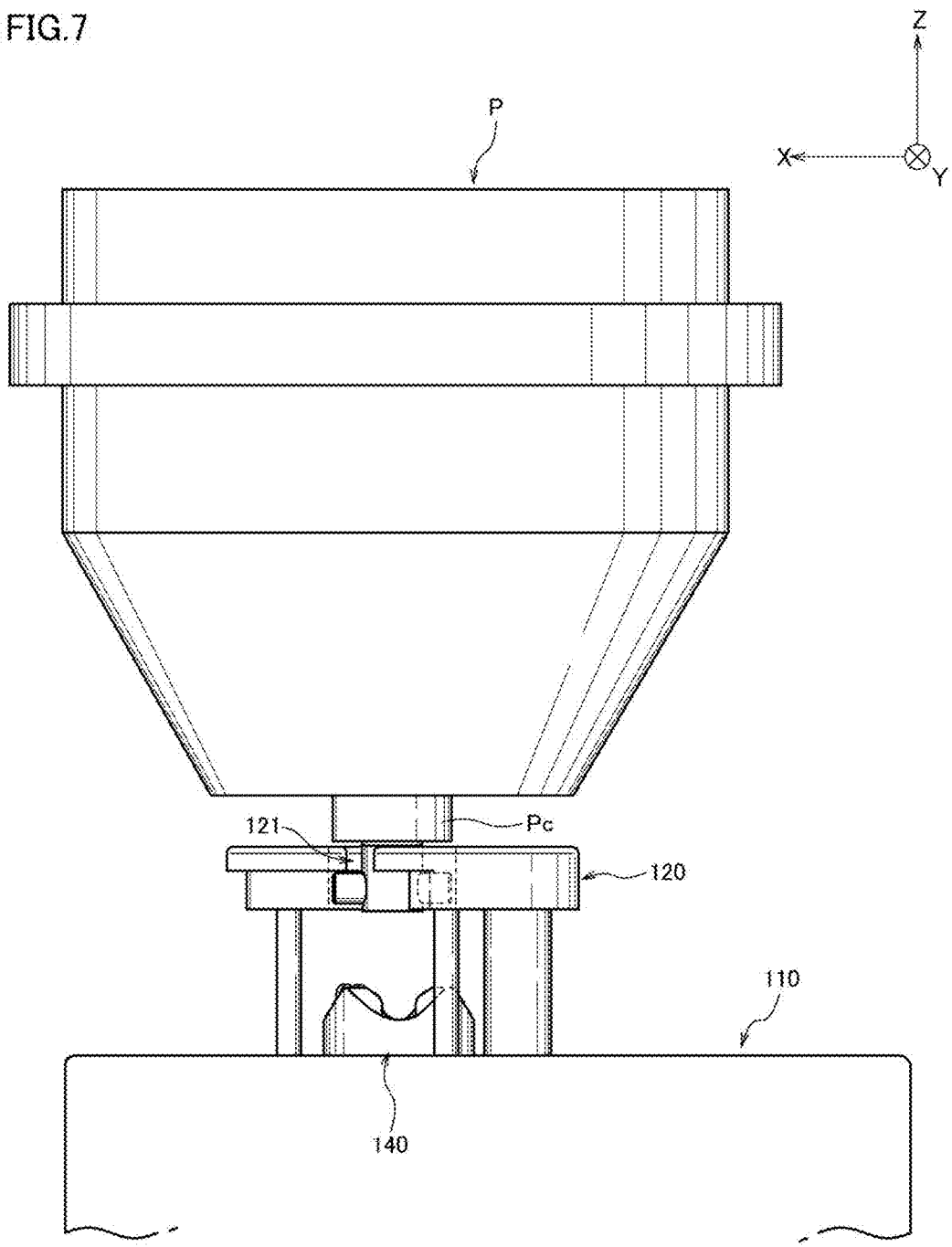
FIG. 7 is a diagram showing a state where the cooking container reaches above the container placement plate of the adjustment stand.
Figure 8A:
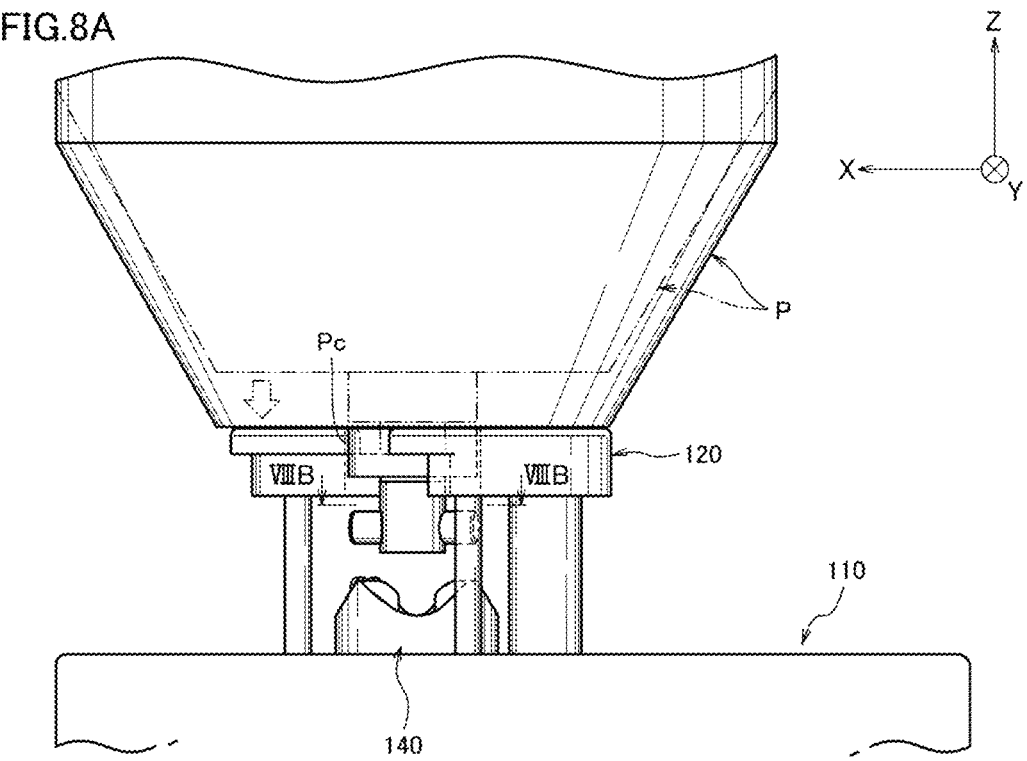
FIG. 8A is a diagram showing a state where the cooking container is placed on the container placement plate.
Figure 8B:
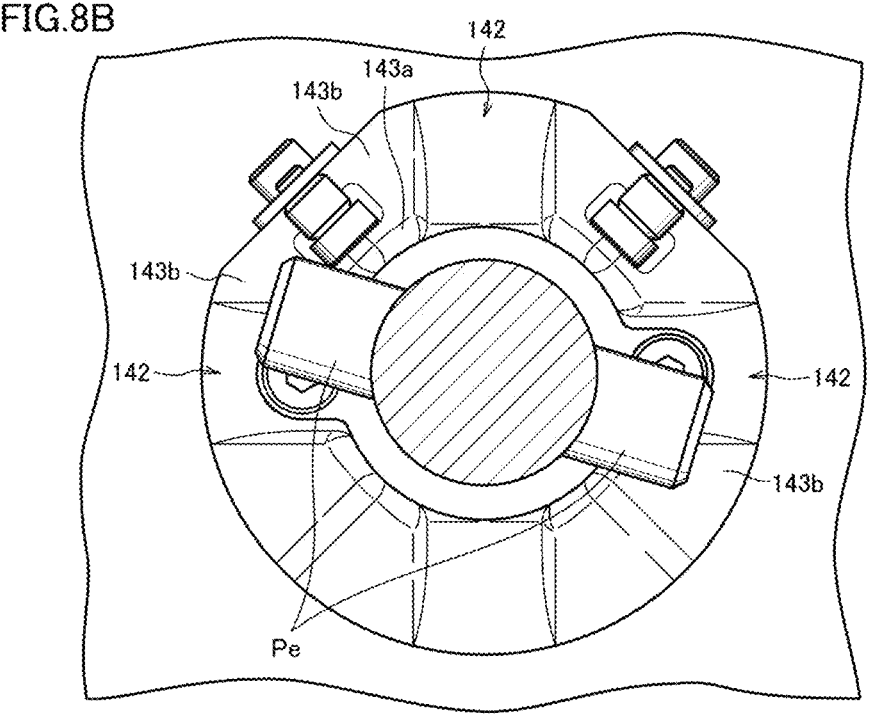
FIG. 8B is a cross-sectional view taken along an arrow line VIIIB-VIIIB in FIG. 8A.
Figure 9A:
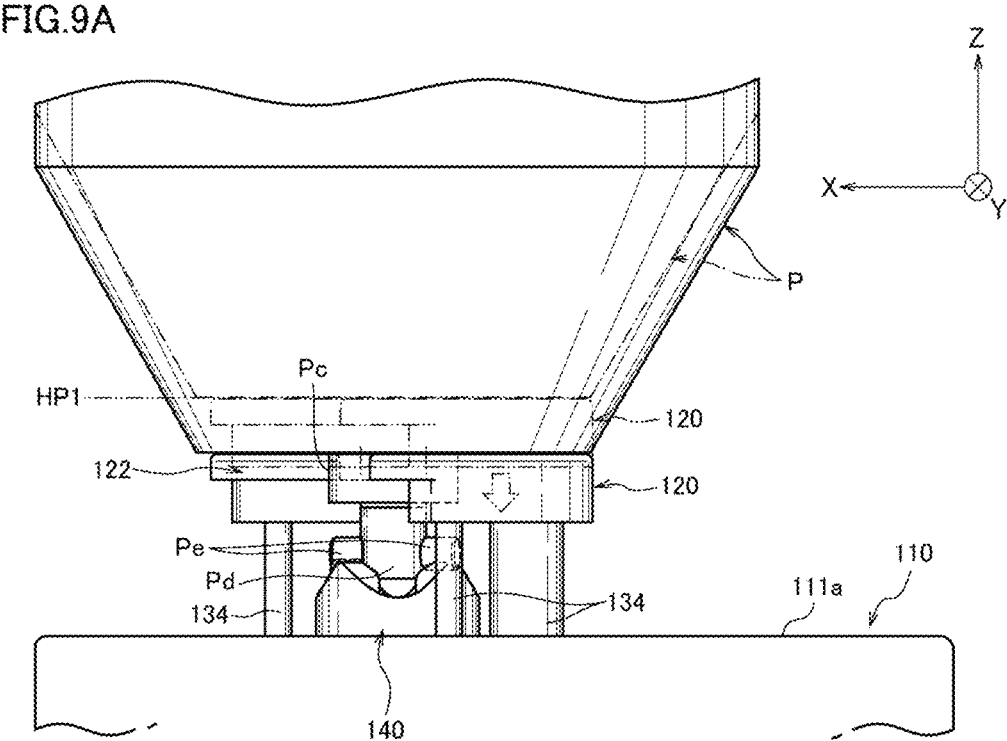
FIG. 9A is a diagram showing a state where the container placement plate having the cooking container placed thereon is lowered and arm-shaped passive parts of the cooking container abut against the alignment member.
Figure 9B:
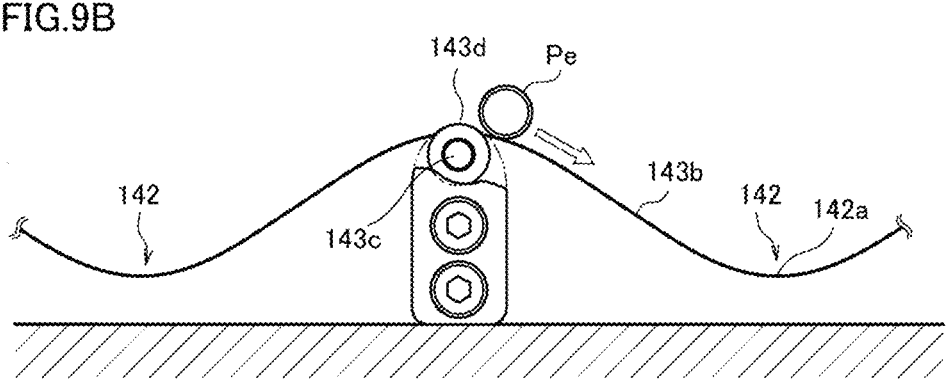
FIG. 9B is a schematic view showing the positional relationship between the arm-shaped passive parts of the cooking container and the alignment member in a state where the arm-shaped passive parts of the cooking container abut against the alignment member.
Figure 10A:
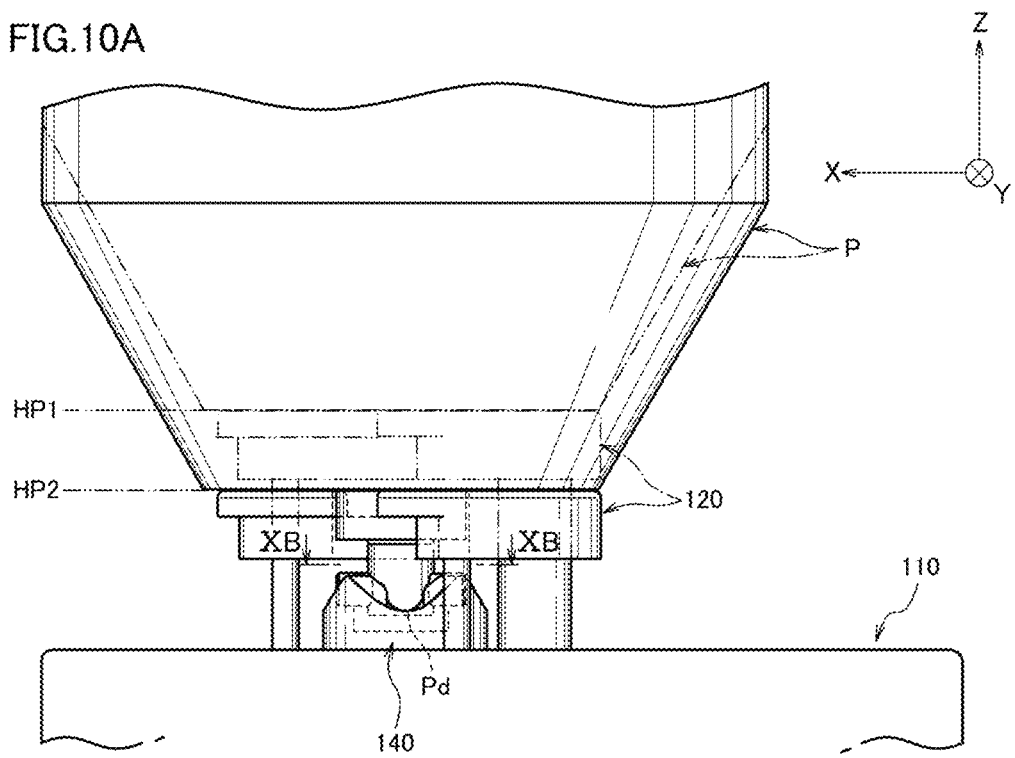
FIG. 10A is a diagram showing a state where the cooking container is aligned in a mounting orientation around a rotating axis.
Figure 10B:
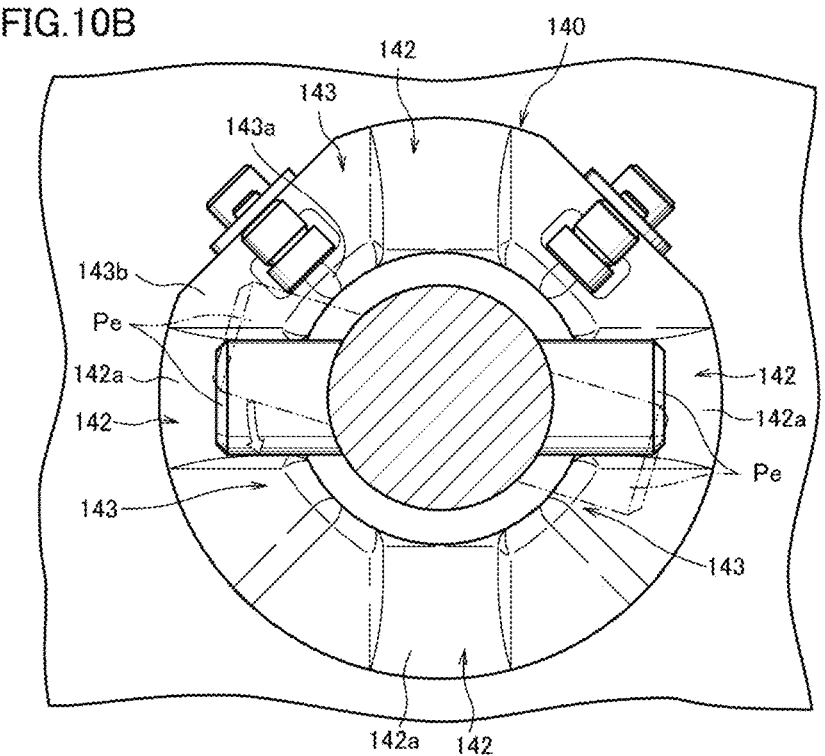
FIG. 10B is a cross-sectional view taken along an arrow line XB-XB in FIG. 10A.

FIG. 6A is a top view showing the positional relationship between the cooking container P to be transferred to the adjustment stand 100 and the adjustment stand 100. FIG. 6B is a view as viewed from a VIB direction in FIG. 6A. FIG. 7 is a diagram showing a state where the cooking container P reaches above the container placement plate 120 of the adjustment stand 100. FIG. 8A is a diagram showing a state where the cooking container P is placed on the container placement plate 120. FIG. 8B is a cross-sectional view taken along an arrow line VIIIB-VIIIB in FIG. 8A. FIG. 9A is a diagram showing a state where the container placement plate 120 having the cooking container P placed thereon is lowered and the arm-shaped passive parts Pe of the cooking container P abut against the alignment member 140. FIG. 9B is a schematic view showing the positional relationship between the arm-shaped passive parts Pe of the cooking container P and the alignment member 140 in the state where the arm-shaped passive parts Pe of the cooking container P abut against the alignment member 140. FIG. 10A is a diagram showing a state where the cooking container P is set in the mounting orientation around the rotating axis. FIG. 10B is a cross-sectional view along an XB-XB arrow line in FIG. 10A.

Here, an operation from a state where the cooking container P having been washed by the washing device is ready to be transferred to the adjustment stand 100 will be described.

The food material supply device 14 may supply food materials to the cooking container P at any timing while the cooking container P is placed on the adjustment stand 100.

As shown in FIGS. 6A and 6B, the cooking-container-transfer unit 12 moves the cooking container P, which has been washed by the washing device, from the side of the opening part 122 for a base shaft of the container placement plate 120 toward above the container placement plate 120 of the adjustment stand 100, with the flange part Pb being held by the cooking-container-holding unit 11.

Here, the container placement plate 120 of the adjustment stand 100 is positioned at a highest position HP1, which is the receiving position of the cooking container P.

Therefore, as shown in FIG. 6B, the insertion shaft part Pc of the cooking container P is positioned above the container placement plate 120.

It is preferable that the upper ends of the arm-shaped passive parts Pe of the cooking container P are positioned below a lower surface 120e of a thin-walled portion in the vicinity of the opening part 122 for a base shaft of the container placement plate 120 in order to avoid interference between the arm-shaped passive parts Pe and the container placement plate 120.

As shown in FIG. 7, when the cooking container P reaches above the container placement plate 120 (that is, the cooking container P is positioned at the conveyance position P2), the insertion shaft part Pc of the cooking container P is positioned directly above the insertion hole part 121 of the container placement plate 120.

After that, the cooking container P is lowered to the container placement plate 120, and when the cooking container P is placed on the container placement plate 120 as shown in FIG. 8A, holding of the cooking container P by the cooking-container-holding unit 11 is released.

Here, as shown in FIG. 8B, when the mounting orientation of the cooking container P with respect to the cooking device 13 around the rotating axis C1 is deviated, the arm-shaped passive parts Pe of the cooking container P are positioned above the inclined guide surfaces 143b of the alignment member 140.

When the cooking container P is placed on the container placement plate 120, the container detection sensor 123 detects the cooking container P.

The control unit 150 then controls the air cylinder 132 to lower the container placement plate 120.

When the container placement plate 120 is lowered slightly from the state in FIG. 8A to the state in FIG. 9A, the arm-shaped passive parts Pe of the cooking container P abut against the inclined guide surfaces 143b of the alignment member 140 as shown in FIG. 9B.

When the container placement plate 120 is further lowered from this state, the arm-shaped passive parts Pe of the cooking container P receive reaction force from the alignment member 140. However, since a diameter D of the insertion hole part 121 of the container placement plate 120 is substantially equal to the diameter d1 of the insertion shaft part Pc of the cooking container P, and also the cooking container P is a heavy article, friction force that the insertion shaft part Pc of the cooking container P receives from the insertion hole part 121 of the container placement plate 120 is larger than the reaction force that the arm-shaped passive parts Pe of the cooking container P receive from the alignment member 140.

Therefore, even when the container placement plate 120 is lowered, the cooking container P abuts against the inclined guide surfaces 143b without floating from the container placement plate 120 due to the reaction force, and the arm-shaped passive parts Pe of the cooking container P continuously travel downward on the inclined guide surfaces 143b toward the nearest recessed seating parts 142 as shown in FIG. 9B.

In addition, since the inclined guide surfaces 143b of the alignment member 140 are formed into a fan shape in plan view, the cooking container P continuously travels downward on the inclined guide surfaces 143b and also rotates about the rotating axis C1.

Then, as shown in FIG. 10A, when the container placement plate 120 is lowered to a lowest position HP2, the arm-shaped passive parts Pe of the cooking container P are housed in the bottom part regions 142a of the recessed seating parts 142 as shown in FIG. 10B. As a result, the alignment of the cooking container P with respect to the cooking device 13 is completed.

When the cooking container P rotates and the mounting orientation of the cooking container P is matched with a prescribed engagement orientation for engagement with the cooking device 13, the container placement plate 120 is first lifted until a lower end of the base shaft part Pd of the cooking container P is positioned above the alignment member 140.

In this state, the cooking container P is held by the cooking-container-holding unit 11, and the insertion shaft part Pc of the cooking container P is lifted above the upper surface 120c of the container placement plate 120.

Then, the cooking-container-transfer unit 12 detaches the cooking container P from the opening part 122 for a base shaft of the container placement plate 120, and moves the cooking container P to the conveyance position P3 where the cooking container P receives pasta noodles fed from the noodle supply device.

<4.2. Case where Deviation Amount in Mounting Orientation Around the Rotating Axis of Cooking Container P is Large>

Next, the aligning operation of the cooking container P in a case where the deviation amount in mounting orientation around the rotating axis of the cooking container P is large will be described with reference to FIGS. 11A and 11B.

Figure 11A:
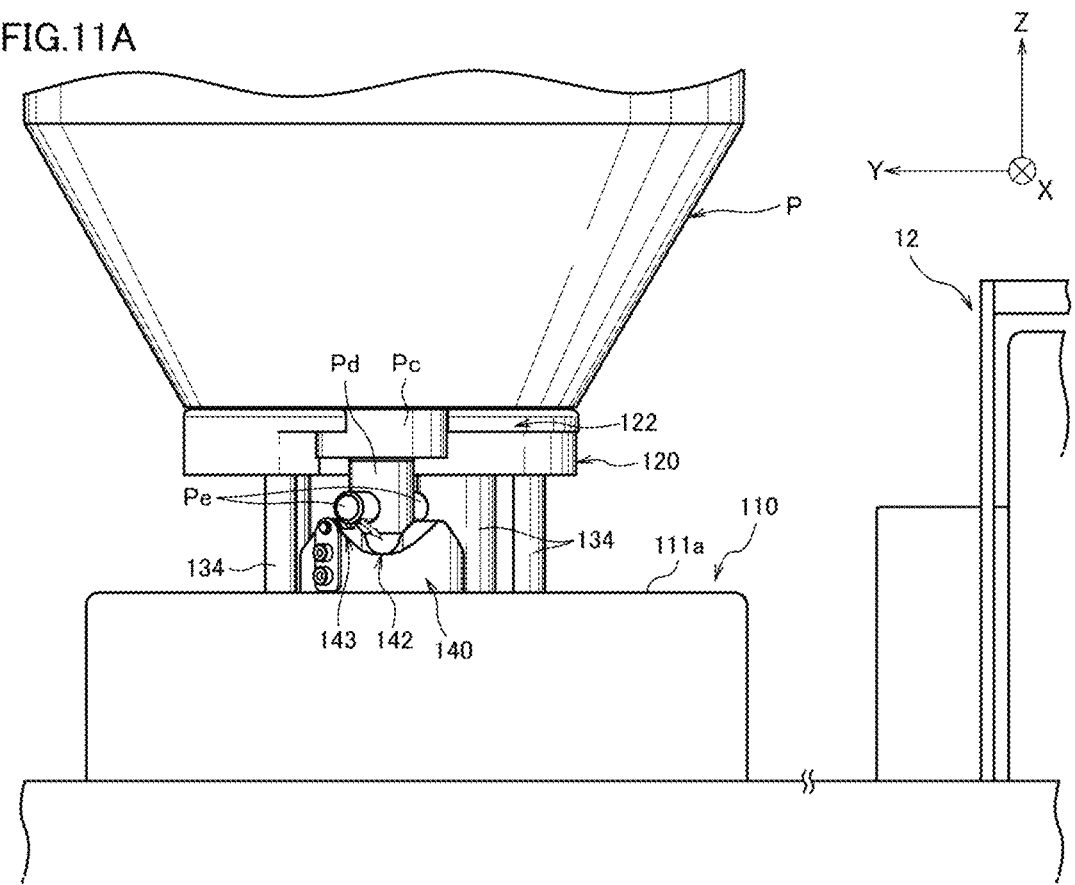
FIG. 11A is a diagram showing a state where the container placement plate having the cooking container placed thereon is lowered and the arm-shaped passive parts of the cooking container abut against the alignment member while a deviation amount in the mounting orientation is large.

FIG. 11A is a diagram showing a state where the container placement plate 120 having the cooking container P placed thereon is lowered and the arm-shaped passive parts Pe of the cooking container P abut against the alignment member 140 while a deviation amount in the mounting orientation is large. FIG. 11B is a schematic view showing the positional relationship between the arm-shaped passive parts Pe of the cooking container P and the alignment member 140 in the state where the arm-shaped passive parts Pe of the cooking container P abut against the alignment member 140 while the deviation amount in the mounting orientation is large.

Figure 11B:
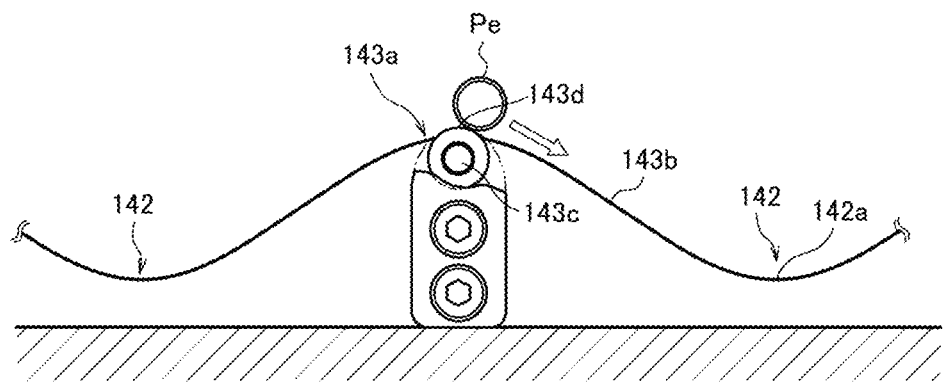
FIG. 11B is a schematic view showing the positional relationship between the arm-shaped passive parts of the cooking container and the alignment member in a state where the arm-shaped passive parts of the cooking container abut against the alignment member while the deviation amount in the mounting orientation is large.

As shown in FIGS. 11A and 11B, when the deviation amount in mounting orientation around the rotating axis C1 of the cooking container P is large, and the cooking container P is deviated to such an extent that the arm-shaped passive parts Pe of the cooking container P abut against the top regions 143a of the protruding guide parts 143, then at least one in the pair of the arm-shaped passive parts Pe abuts against the roller 143d as the container placement plate 120 is lowered.

Even in such a case, as the container placement plate 120 is further lowered as shown in FIG. 11B, the arm-shaped passive parts Pe of the cooking container P are smoothly guided onto the inclined guide surfaces 143b on the side of the nearest recessed seating parts 142 with the rotation of the rollers 143d, without staying on the top regions 143a of the protruding guide parts 143.

<5. Effect Demonstrated by Adjustment Stand 100 and Automatic Cooking Equipment 10>

The automatic cooking equipment 10 described in the foregoing includes the adjustment stand 100 that is the mounting orientation adjustment stand for a cooking container to set and adjust the orientation of the cooking container P with respect to the cooking device 13. Accordingly, when the cooking container P is directly transferred from the adjustment stand 100 to the cooking device 13, the cooking container P is engaged with the cooking device 13 without the necessity of complex mechanisms or controls in engaging the cooking container P with the cooking device 13, so that the cooking device 13 with a simple structure can be implemented.

The adjustment stand 100 described in the foregoing includes the alignment member 140 that is placed on the top surface 111 of the adjustment stand body 110 to set the mounting orientation of the cooking container P around the rotating axis C1 with respect to the cooking device 13. Accordingly, the mounting orientation of the cooking container P with respect to the cooking device 13 can be adjusted to a prescribed mounting orientation by simply lowering the container placement plate 120 having the cooking container P placed thereon, and therefore the mounting orientation of the cooking container P with respect to the cooking device 13 can be easily adjusted to a prescribed mounting orientation by simply lowering the container placement plate 120.

The alignment member 140 includes the four recessed seating parts 142 provided in a circumferential direction of the alignment member 140 to house the arm-shaped passive parts Pe of the cooking container P, the protruding guide parts 143 that provide smooth coupling of the four recessed seating parts 142, and the rollers 143d disposed at top regions 143a of the protruding guide parts 143 so as to be rotatable in the circumferential direction. Accordingly, even when the cooking container P is placed on the container placement plate 120 in an orientation where the arm-shaped passive parts Pe of the cooking container P are not housed in the recessed seating parts 142 of the alignment member 140, the arm-shaped passive parts Pe of the cooking container P are pressed to the recessed seating parts 142 by its own weight of the cooking container P when the container placement plate 120 lowered causes the arm-shaped passive parts Pe of the cooking container P to abut against the alignment member 140. As a result, the cooking container P rotates along the protruding guide parts 143 of the alignment member 140, which makes it possible to easily set the mounting orientation of the cooking container P with respect to the cooking device 13 to a prescribed mounting orientation.

The container placement plate 120 includes the insertion hole part 121 formed at the center of the container placement plate 120 to allow insertion of the insertion shaft part PC of the cooking container P and the opening part 122, for a base shaft, that expands in a fan shape from the insertion hole part 121 and draws out the base shaft part Pd of the cooking container P in the horizontal direction, so that the container placement plate 120 is formed into a C-shape. Furthermore, the opening part 122, for a base shaft, formed on the container placement plate 120 has the minimum opening width W that is smaller than the diameter d1 of the insertion shaft part Pc formed on the cooking container P and larger than the diameter d2 of the base shaft part Pd formed on the cooking container P. Accordingly, in a state where the insertion shaft part Pc of the cooking container P is inserted into the insertion hole part 121 of the container placement plate 120 and the cooking container P is placed on the container placement plate 120, the cooking container P is not detached from the opening part 122 for a base shaft. On the other hand, in a state where the cooking container P is slightly lifted with respect to the container placement plate 120 and the base shaft part Pd of the cooking container P is inserted into the insertion hole part 121 of the container placement plate 120, the cooking container P is detached from the opening part 122 for a base shaft. This makes it possible to attach and detach the cooking container P to and from the adjustment stand 100 with a small movement amount.

Modifications

As described in the foregoing, the mounting orientation adjustment stand for a cooking container and the automatic cooking equipment as examples of the present invention have been described. However, the mounting orientation adjustment stand for a cooking container and the automatic cooking equipment are not limited to the mounting orientation adjustment stand for a cooking container and the automatic cooking equipment of the examples described above.

For example, in the examples described above, the container placement plate 120 is in a C-shape having the opening part 122 for a base shaft. However, as long as the cooking container P can be placed thereon, the shape of the container placement plate 120 is not limited to the C-shape, and may be an annular shape, for example.

For example, in the examples described above, the roller 143d is disposed on each of the top regions 143a of the two protruding guide parts 143, which are adjacent to each other with one recessed seating part 142 interposed therebetween. However, the number of the protruding guide parts 143 on which the roller 143d is disposed are not limited to two, and the roller 143d may be disposed on the top regions 143a of all the protruding guide parts 143. The roller 143d may also be omitted by adopting a configuration that prevents the arm-shaped passive parts Pe from staying on the top regions 143a of the protruding guide parts 143 by forming the top regions of the protruding guide parts 143 into a slippery shape or by forming them by using slippery materials.

For example, in the examples described above, the container placement plate 120 is freely lifted and lowered by the air cylinder 132. However, any lifting mechanism can be used as long as the container placement plate 120 can be lifted and lowered. For example, an electric actuator may also be used.

For example, although the container detection sensor 123 is a proximity sensor in the examples described above, the container detection sensor 123 may be an imaging device such as a camera as long as it is possible to detect the presence or absence of the cooking container P placed on the container placement plate 120. In this case, image analysis may be performed to detect the presence or absence of the cooking container P placed on the container placement plate 120.

For example, although the adjustment stand body 110 has been illustrated so as to be provided on the base B in the examples described above, part of the base B may be used as the adjustment stand body 110, and the upper surface of the base B may be used as the top surface 111.

For example, in the examples described above, the cooking device 13 is used as a cooking device that performs cooking while rotating the cooking container P. However, it is also possible to use a device that rotates the cooking container P without heating for the purpose of agitating the food materials stored in the cooking container P to cope with cooking of salad or the like.

For example, in the examples described above, the cooking-container-holding unit 11 places the cooking container P on the container placement plate 120. However, an operator may place the cooking container P on the container placement plate 120.

The invention claimed is:

1. A mounting orientation adjustment stand, for a cooking container, that sets and adjusts a mounting orientation of a cooking container with respect to a cooking device, used in automatic cooking equipment including
   a cooking-container-holding unit configured to detachably hold the cooking container, the cooking container being configured to receive a food material so that the food material is freely stored, and the cooking container having a passive part that is configured to protrude downward from the center of the bottom of the cooking container in a same axis as a rotating axis of the cooking container,
   a cooking-container-transfer unit configured to transfer the cooking-container-holding unit to various conveyance positions in accordance with the cooking procedures, and
   a cooking device configured to detachably hold the cooking container and perform cooking,
   the mounting orientation adjustment stand comprising:
   a container placement plate configured to allow the cooking container to be rotatably placed around the rotating axis thereon;
   an alignment member configured to set a mounting orientation of the cooking container around the rotating axis; and
   a distance adjustment mechanism configured to position the cooking container in the mounting orientation around the rotating axis, by the passive part is guided along the recessed and protruding shape of the annular guide part.

2. The mounting orientation adjustment stand for a cooking container according to claim 1, wherein:
   the mounting orientation adjustment stand further comprises an adjustment stand body disposed facing the cooking-container-transfer unit, wherein the adjustment stand body is configured to wait for the cooking container; and
   the container placement plate is an annular shaped member, wherein the container placement plate faces a flat top surface of the adjustment stand body at a distance, and is configured to allow the cooking container to be rotatably placed around the rotating axis thereon.

3. The mounting orientation adjustment stand for a cooking container according to claim 1, wherein:
the distance adjustment mechanism is a placement-plate-lifting mechanism configured to lift and lower the container placement plate with respect to the top surface of the adjustment stand body.

4. The mounting orientation adjustment stand for a cooking container according to claim 1, wherein:
the cooking container includes an arm-shaped passive part provided at a center of a bottom part of the cooking container so as to protrude in a horizontal direction; and
the alignment member includes a plurality of recessed seating parts that are provided in a circumferential direction of the alignment member to house the arm-shaped passive part of the cooking container, protruding guide parts smoothly coupled with the plurality of recessed seating parts, and rollers disposed at top regions of the protruding guide parts so as to be rotatable in the circumferential direction.

5. The mounting orientation adjustment stand for a cooking container according to claim 1, wherein:
the cooking container includes an insertion shaft part that is provided so as to protrude downward from a center of a bottom part of the cooking container and to be inserted into the container placement plate, a base shaft part extending from the insertion shaft part and being smaller in diameter than the insertion shaft part, and an arm-shaped passive part extending in a horizontal direction from the base shaft part;
the container placement plate includes an insertion hole part formed in a center of the container placement plate to allow insertion of the insertion shaft part of the cooking container and an opening part, for a base shaft, that expands in a fan shape from the insertion hole part and draws out the base shaft part of the cooking container in the horizontal direction, so that the container placement plate is formed into a C-shape; and
the opening part, for a base shaft, formed on the container placement plate has a minimum opening width that is smaller than a diameter of the insertion shaft part formed on the cooking container and larger than a diameter of the base shaft part formed on the cooking container.

6. The mounting orientation adjustment stand for a cooking container according to claim 5 wherein the insertion hole part formed in the container placement plate has a diameter substantially equal to the diameter of the insertion shaft part formed on the cooking container.

7. An automatic cooking equipment configured to cook a food material stored in a cooking container, the automatic cooking equipment comprising:
the cooking-container-holding unit configured to detachably hold and displace the cooking container in accordance with cooking procedures, the cooking container being configured to receive the food material so that the food material is freely stored, and the cooking container having the passive part that is configured to protrude downward from the center of the bottom of the cooking container in the same axis as the rotating axis of the cooking container;
the cooking-container-transfer unit configured to transfer the cooking-container-holding unit to various conveyance positions in accordance with the cooking procedures;
the cooking device configured to detachably hold the cooking container and perform cooking; and
the mounting orientation adjustment stand for the cooking container according to claim 1, the mounting orientation adjustment stand for the cooking container being configured to set and adjust an orientation of the cooking container with respect to the cooking device.

* * * * *